A. Weikart,
Boring Wood.
Nº 7,031.                    Patented Jan. 15, 1850.
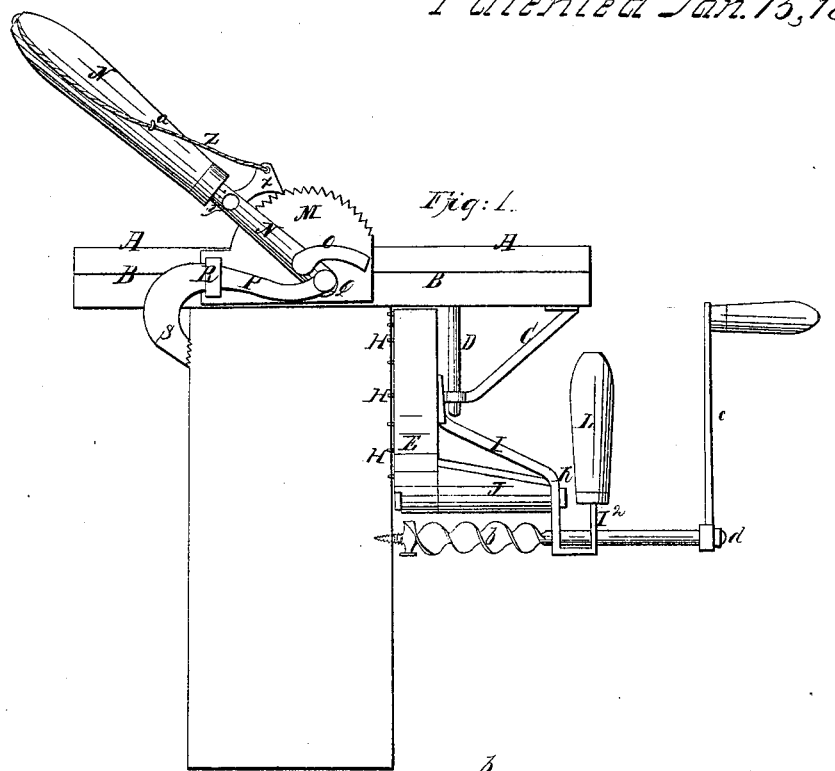
Fig: 1.
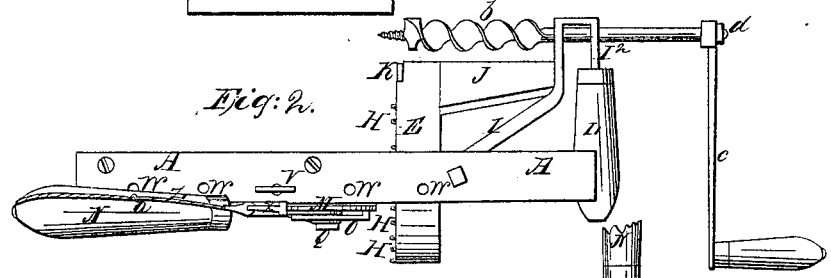
Fig: 2.
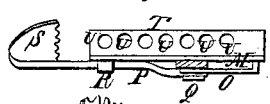
Fig: 4.
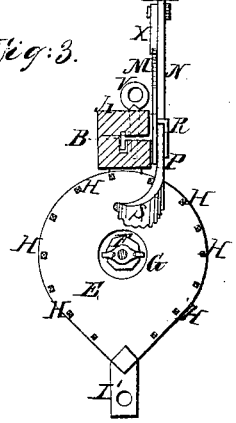
Fig: 3.
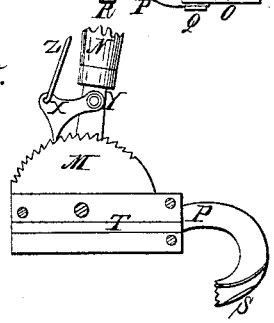
Fig: 5.

UNITED STATES PATENT OFFICE.

ANDREW WEIKART, OF GREENFORD, OHIO.

BORING-MACHINE.

Specification of Letters Patent No. 7,031, dated January 15, 1850.

*To all whom it may concern:*

Be it known that I, ANDREW WEIKART, of Greenford, in the county of Mahoning and State of Ohio, have invented a new and useful Implement for Boring; and I do hereby declare that the following is a full and exact description of the construction and operation of the same, reference being had to the annexed drawings, making part of this specification.

Figure 1, is an elevation of the side of the implement showing its position when clamped to the timber to be bored. Fig. 2 is a plan or top view of the same—the boring tool, with its adjustive clamping block, being in a position different to that seen in Fig. 1, and not clamped to any timber. Fig. 3, is an end elevation of ditto. Fig. 4, is a plan or top view of the right angle plate, and hooked-shaped clamping arm. Fig. 5, is an elevation of the inside of the toothed plate holding pawl or dog &c.

The same letters of reference used in the specification indicate the same parts, where they are seen on the above mentioned figures.

The nature of this invention consists in the construction of an implement or tool, to be applied to the sides of beams of timber and other articles to be bored; said implement or tool being adjusted and clamped in the position desired to bore; the auger being at right angles to the face of the article being bored and provided with a crank by which it is turned.

To enable others skilled in the art to make and use this tool, I will proceed to describe its construction and operation.

It consists of a stock A, clamped over and upon the article to be bored, composed of two parts bolted together, in order to form therein a groove B, which forms a right angle in its cross section, extending its entire length; in which a correspondingly shaped plate projecting from a vertical toothed plate (to which a hook shaped clamping arm, is secured) is made to fit and move, to adjust the clamping arm to different thicknesses of timber.

C is an iron crane, brace, or bar, bolted to the under side of the end of the stock A and projects downward and obliquely, its end bent parallel with the stock A, to receive an adjustive clamping block; said crane bar or brace being firmly braced by a screw bolt D projecting downward from the stock A, and screwed into the lower end thereof.

E, is an adjustive clamping block, having an opening in its center, through which the end of the crane or bar C, (upon which is cut a screw thread) passes, and to which the said clamping block is confined (and allowed to turn in adjusting the same), by means of a confining nut F screwed thereon against a ring of leather or other washer, there being also a circular recess G, made around the central opening on the inside of said block, to receive said confining nut F and allow the block to lie flush against the timber. This clamping block is of a circular form, except about three fourths of its circumference; the remaining fourth is elongated or brought to a point as represented in Fig. 3, and is provided with a series of short points H, projecting from its inner surface, which enter the timber and secure the block from slipping when adjusted and clamped against the timber as shown in Fig. 1.

I is a bent holding and guiding bar, secured to the clamping block in the center thereof, and having an opening therein corresponding with the central opening in the block, through which the end of the crane C, also passes. This bar extends obliquely outward and downward over an arm J, projecting horizontally from the elongated or pointed portion of the block E, and is secured thereto by a bolt K, passing through it and said block. The outer end of this bar I, is bent in the form of a parallelogram at right angles to the shank of the auger, either branch being perforated with a round opening I′, Fig. 3, in which the shank of the boring tool is confined and permitted to move around on its axis and likewise longitudinally toward the beam during the operation. Upon the outer branch I² of this bar I is also secured a handle L, which the operator lays hold with his right hand to adjust the clamping block and auger in the desired positions.

M, is a movable plate projecting vertically from the side of the bar A, forming nearly a semicircle, and notched or toothed on its upper edge.

N is a combined handle and lever, by which the operator actuates the hook shaped clamping arm P, secured to the vertical plate M, near its base or lower edge by a bolt and arm O, serving as its fulcrum. P is the said hook shaped clamping arm, which clamps the timber firmly against the adjustive clamping block E. This clamping arm P, is connected to the lower end of the lever or handle N, (which is extended beyond its fulcrum o,) by a bolt Q, and passes through a staple R, secured to the plate M, in the form of a hook, with its hook end S widened and toothed or serrated, in order to enter the timber and firmly clamp the implement or tool thereto as the lever or handle N is depressed in the arc of a circle in the direction of the arrow, Fig. 1.

T is a right angled flanched plate, bolted to and projecting from the vertical toothed plate M see Fig. 5, and made to fit and move horizontally in the groove B, its horizontal portion being perforated with a series of holes U, through which the end of a locking pin V, passes. See Fig. 3.

V is a locking pin inserted into one of a series of holes W, made vertically through the horizontal bar A, and into one of the holes U in the plate T, and which thus locks and connects the toothed plate M, to the stock or bar A, near to or farther from the adjustive clamping block to suit the thickness of the timber to be bored.

X is a holding pawl, secured to the lever or handle N, by a bolt Y, upon which said pawl turns. Said pawl moving over the teeth of the vertical plate M, and holding the clamping arm against the timber.

When it is desired to unclamp the implement the pawl is disengaged by means of a cord Z, attached thereto and extending upward through an eye (a) and secured to the handle N.

(b) is the auger made in the usual manner having its shank round, and confined loosely in the openings or bearings in the bar I.

(c) is a crank handle secured to the shaft of the auger by a nut (d).

The operation is as follows: The implement being properly constructed and put together for use, the toothed plate M with its clamping arm P, is moved against the side of the timber and the locking pin V inserted into one of the holes of the stock A, and a corresponding hole in the right angled plate T which thus secures the implement firmly to the timber to be bored. The operator then grasps the handle L, and adjusts the clamping block E, with the point of the auger (b) exactly in the required position to bore the hole as desired. He then depresses the lever N in the arc of a circle which draws the clamping hook P, against the opposite side of the timber, when the pointed pins H of the clamping block will be made to enter the side of the timber, the combined lever and hook being held in their clamped position by the holding pawl X. The operator will then turn the handle (c) to the right and the auger will bore the hole accurately and expeditiously. The motion of the crank handle (c) is then reversed and the auger withdrawn. The lever or handle N is then depressed slightly to relieve the pressure from the pawl. The pawl X will then be disengaged from the teeth of the plate M and thus the implement will be unclamped from the timber, and ready to be reclamped in another position to bore another hole. In this manner the operation is continued. The adjustive clamping block being secured on the end of the bar I in the manner described, allows of its being turned with the boring tool to the right or to the left in the arc of a circle, in order to adjust the auger properly at the point desired to bore the hole while the stock A remains firmly upon the immovable timber.

The manner of using this implement may be varied so as to bore with the auger in a vertical position; in which case the length of the stock A should be increased and the other parts modified accordingly.

The socket of the crank handle of the boring tool, may be provided with a thumb screw, by which it is clamped to the shank thereof, and which will allow said boring tool to be attached to, and used with a common auger handle.

I do not, in this application, claim to be the original inventor of an adjustive boring machine to be affixed to the stationary timber to be bored, as I have heretofore patented such a machine, and as various combinations of mechanical devices to produce such a machine have been made and used, but What I do claim as my original invention and desire to secure by Letters Patent is—

The combination of the jointed hook lever N, P, pawl X, notched plate M, perforated flanched plate T, crane C, adjustive clamping block E, with the adjustive stock A, for adjusting and confining the bearings of the boring tool to the timber to be bored in any desired position for boring holes in the timber at any required angle without moving the timber, as described.

In testimony whereof I have hereunto signed my name before two subscribing witnesses.

A. WEIKART.

Witnesses:
DAVID WEIKART,
MOSES BUCK.